United States Patent [19]
Hashimoto et al.

[11] Patent Number: 5,244,736
[45] Date of Patent: * Sep. 14, 1993

[54] MAGNETIC RECORDING MEDIUM HAVING MULTIPLE MAGNETIC LAYERS WITH SPECIFIED COMPOSITIONS

[75] Inventors: Hiroshi Hashimoto; Hideomi Watanabe; Akira Ushimaru; Kazuko Hanai; Akihiro Matsufuji, all of Kanagawa, Japan

[73] Assignee: Fuji Photo Film Co., Ltd., Kanagawa, Japan

[*] Notice: The portion of the term of this patent subsequent to Jul. 21, 2009 has been disclaimed.

[21] Appl. No.: 675,001

[22] Filed: Mar. 26, 1991

[30] Foreign Application Priority Data

Mar. 26, 1990 [JP] Japan .................................. 2-73200
Mar. 26, 1990 [JP] Japan .................................. 2-73201
Apr. 12, 1990 [JP] Japan .................................. 2-96758

[51] Int. Cl.$^5$ .............................................. G11B 5/00
[52] U.S. Cl. .................................. 428/403; 428/425.9; 428/413; 428/480; 428/522; 428/523; 428/524; 428/532; 428/694 ST; 428/900; 428/694 B; 427/128; 427/131; 252/62.54
[58] Field of Search ............... 428/403, 425.9, 694, 428/900, 522, 523, 532, 524, 480, 413; 427/128, 131; 252/62.54

[56] References Cited

U.S. PATENT DOCUMENTS

| | | | |
|---|---|---|---|
| 4,851,289 | 7/1989 | Ogawa et al. | 428/329 |
| 5,030,481 | 7/1991 | Hashimoto et al. | 427/130 |
| 5,032,428 | 7/1991 | Ogawa et al. | 427/130 |

FOREIGN PATENT DOCUMENTS 62-075930 4/1987 Japan .

*Primary Examiner*—Stevan A. Resan
*Attorney, Agent, or Firm*—Sughrue, Mion, Zinn, Macpeak & Seas

[57] ABSTRACT

A magnetic recording medium comprising a non-magnetic support having thereon a multi-layer magnetic layer structure comprising ferromagnetic fine powder and a binder, wherein said multi-layer magnetic layer structure is formed by coating a first composition containing the ferromagnetic fine powder and a polyisocyanate compound on the non-magnetic support to form a first magnetic layer and coating a second composition containing ferromagnetic fine powder and an epoxy compound having at least one epoxy group or a coupling agent on said first magnetic layer to form a second magnetic layer, wherein coating of said second magnetic layer is conducted simultaneously with or after coating said first magnetic layer while said first magnetic layer is still in a wet state, by a simultaneous or successive multiple layered coating method.

19 Claims, No Drawings

MAGNETIC RECORDING MEDIUM HAVING MULTIPLE MAGNETIC LAYERS WITH SPECIFIED COMPOSITIONS

FIELD OF THE INVENTION

The present invention relates to a magnetic recording medium for high-density recording, which has a multilayer structure comprising two or more magnetic layers. More particularly, it relates to a magnetic recording medium excellent in electromagnetic characteristics and running durability.

BACKGROUND OF THE INVENTION

Magnetic recording media are widely used in the fields of recording tapes, video tapes, tapes for computers and floppy disks. The magnetic recording medium is basically composed of such a structure including a magnetic layer composed of ferromagnetic fine particles dispersed in a binder which is laminated onto a nonmagnetic support.

Generally speaking, the magnetic recording media are demanded to have high performance capability with regard to characteristics such as electromagnetic characteristics, running durability and running performance. Particularly, it is required that video tapes have high video output and are excellent in the reproducibility of the original picture, particularly electromagnetic characteristics with the spread of contemporary eight mm video, high band eight mm video and S-VHS videotape recorders.

Many methods for improving the electromagnetic characteristics of the magnetic recording media have been proposed. Among them, methods for improving the characteristics of ferromagnetic fine particles, which are magnetic recording substances, have been shown to be capable of directly improving electromagnetic characteristics and are effective. For instance, ferromagnetic powders have been finely divided into finer powders in order to enhance the capability of conducting high-density recording. Further, the materials of ferromagnetic powders have been changed from iron oxide to iron oxide modified with different metals such as cobalt. Further, ferromagnetic metals such as iron, nickel and cobalt or alloys thereof have been used.

Magnetic recording media having good electromagnetic characteristics can be essentially obtained by using such improved ferromagnetic fine powder. However, as a practical matter, it is difficult to produce magnetic recording media having improved electromagnetic characteristics equivalent to a degree which is proportional to the improvement in ferromagnetic fine powders per se. This is attributable to the fact that the dispersibility of ferromagnetic powders has a tendency to decrease in binders along with any reduction in the particle size of the ferromagnetic powders. Further, the dispersibility of ferromagnetic fine powders have characteristics such that the dispersibility is apt to be more greatly lowered in the order of $\gamma$-iron oxide, cobalt-deposited $\gamma$-iron oxide and fine powders of ferromagnetic metals. As a result, there is a possibility that the dispersive condition of the ferromagnetic fine powders may become poorer conversely to improvements provided in the ferromagnetic fine powders per se. Accordingly, the excellent electromagnetic characteristics of the ferromagnetic fine powders cannot be sufficiently exhibited and as a result, magnetic recording media having improved electromagnetic characteristics which are proportional to the degree of improvement provided in the ferromagnetic fine powders per se cannot be obtained.

Many attempts to improve the dispersibility of ferromagnetic fine powders have been made. For example, binders having a polar group such as $-SO_3M$, $-OSO_3M$, $-PO_3M_2$, $-OPO_3M_2$, $-COOM$, $-NR_2$ or $-N^{\oplus}R_3X^{\ominus}$, or binders having said polar group and an epoxy ring, as the improvement of binders are disclosed in JP-B-58-41565 (the term "JP-B" as used herein means an "examined Japanese patent publication"), JP-A-57-44227 (the term "JP-A" as used herein means an "unexamined published Japanese patent application"), JP-A-59-30235, JP-A-60-238306, JP-A-60-238309, JP-A-60-238371 and JP-A-61-172213. These binders have high adsorptivity to ferromagnetic fine powders and good dispersibility in comparison with conventional binders. However, even when these binders are used, the finer the particle size provided in the ferromagnetic fine powder for purposes of high density recording, the more difficult the dispersion thereof becomes, and, as a result, excellent electromagnetic characteristics of ferromagnetic fine powder cannot be sufficiently exhibited. Accordingly, a demand has arisen to develop a method for sufficiently exhibiting the electromagnetic performance of highly dispersible binders.

In response to this demand, one suggested method involves a kneading-dispersion carried out for a large number of hours during the preparation of magnetic coating solutions in order to improve the dispersion state of the ferromagnetic fine powders. However, there is a problem associated with the use of kneading in that the characteristics of ferromagnetic fine powders are deteriorated because considerable shearing forces are exerted on the ferromagnetic fine powders during kneading dispersion. Further, this method has a problem in regard to production efficiency, that is, manufacturing cost, since a large number of hours are required for the production of the magnetic recording media due to the prolonged kneading step.

In order to solve the above-mentioned problems, there have been proposed a method using surface-treated ferromagnetic fine powders obtained by treating the surfaces of the powders with a surface treating agent such as a silane coupling agent, and a method wherein dispersion is carried out by using dispersants such as fatty acids or phosphoric esters, and a method wherein a product obtained by adding a low-molecular epoxy resin to a system comprising a vinyl copolymer and a urethane prepolymer is used as a binder (see, e.g., JP-B-56-23210).

When the surfaces of ferromagnetic fine powders are treated by the aforesaid methods using the silane coupling agent or the dispersants, the affinity of the surfaces of ferromagnetic fine powders with the binders can be improved and the dispersion rate is increased. However, the ferromagnetic fine powders are not firmly bonded to the binders and dispersibility, including dispersion stability, is still insufficient.

When dispersion is carried out by using low-molecular epoxy resins or compounds having an epoxy group, there are disadvantages from the viewpoint of undesired reactions between $-OH$ groups derived from epoxy groups during kneading and polyisocyanate compounds used as hardening agents. That is, when polyisocyanate compounds are used in combination with said epoxy resins or compounds having epoxy groups to improve the mechanical strength and running durability of magnetic layers the epoxy group is opened during kneading and dispersion in the preparation of magnetic coating solutions, and the formed —OH group reacts with the polyisocyanate compounds. As a result, the pot life of the magnetic coating solutions is greatly shortened.

There are known methods using ferromagnetic fine powders obtained by treating the surfaces of the powders with a surface treating agent such as a coupling agent having amino group, —OH group or epoxy group as a functional group capable of being bonded to the binders to solve the above-mentioned problem (see, JP-A-56-143533, JP-A-57-186302, JP-A-58-155517, JP-A-58-155703, JP-A-58-205929, JP-A-59-079433, JP-A-60-173721, JP-A-61-026935, JP-A-60-107731, JP-A-60-127526 and JP-A-1-173321).

On the other hand, when the particle size of ferromagnetic fine powders becomes extremely fine, the thickness of the binder coating the ferromagnetic powders becomes thinner and, as a consequence, elongation at break of the magnetic layers becomes small and very brittle magnetic layers are formed if the amount of the binder is not increased. When the magnetic layers are brittle in nature, a problem is encountered when tapes are repeatedly run in that the magnetic layers at the edge parts of the tapes are liable to be cracked, and the magnetic layer material at the cracked portions are broken and dropped out. As a result, drop out is increased. Alternatively, powder drops out from the tape edge part of the magnetic layer during the slitting stage of original tape production, and drop out is increased.

To solve the above-mentioned problems, there have been proposed a method wherein the amounts of the polyisocyanate compounds to be added are reduced, and a method wherein plasticizers are added. However, these methods are only effective in the inhibition of brittleness, yet increase the temperature dependence of the mechanical strength of the magnetic layers and cause a lowering in mechanical strength under high-temperature conditions in particular. Hence, durability is lowered by these methods also.

When the aforesaid coupling agents having a functional group are used together with the polyisocyanate compounds, the polyisocyanate compounds are reacted with the functional group of the coupling agent and further with the binders having —OH group to thereby bond them to each other so that the mechanical strength and heat resistance of the magnetic layers can be improved. However, since the functional group of the coupling agents is readily reacted with the polyisocyanate compounds in the magnetic coating composition, there is a serious disadvantage that the viscosity of the coating composition is greatly increased rendering virtually impossible the coating of the magnetic layers during the tape manufacturing process. Or, even when the coating can be conducted, the smoothness of the surfaces of the magnetic layers is greatly lowered and electromagnetic characteristics are lowered.

Accordingly, an effective solution has been highly demanded insofar as to develop a magnetic recording medium for high density recording, in which ferromagnetic fine powder having a very small particle size is highly dispersed, and which has very high electromagnetic characteristics and running durability.

SUMMARY OF THE INVENTION

An object of the present invention is to provide a magnetic recording medium for high-density recording, which has a multi-layer structure comprising two or more magnetic layers and is excellent in electromagnetic characteristics (particularly video characteristics) as well as in running durability.

Another object of the present invention is to provide a magnetic recording medium in which the surface thereof has a low coefficient of friction ($\mu$ value) and which has improved running properties.

The above-described objects of the present invention have been achieved by providing a magnetic recording medium comprising a non-magnetic support having thereon a multi-layer magnetic layer structure comprising ferromagnetic fine powder and a binder, wherein said multi-layer magnetic layer structure is formed by coating a first composition containing the ferromagnetic fine powder and a polyisocyanate compound on said non-magnetic support to form a first magnetic layer (lower layer) and coating a second composition containing the ferromagnetic fine powder and an epoxy compound having at least one epoxy group or a coupling agent on said first magnetic layer to form a second magnetic layer (upper layer), wherein coating of said second magnetic layer is conducted simultaneously with or after coating said first magnetic layer while said first magnetic layer is still in a wet condition, by a simultaneous or successive multiple layered coating method.

DETAILED DESCRIPTION OF THE INVENTION

In a preferred embodiment of the present invention, the epoxy compound to be incorporated in the coating composition for the second magnetic layer is an epoxy compound having at least two epoxy groups.

In another preferred embodiment of the present invention, the epoxy compound to be incorporated in the second coating composition used for the second magnetic layer is a low-molecular epoxy compound having a molecular weight of not more than 2000 and at least one epoxy group and at least one polar group per molecule, said polar group being selected from the group consisting of —SO$_3$M, —OSO$_3$M, —OPO(OM)$_2$, —PO(OM)$_2$ and —COOM wherein M is an alkali metal or ammonium ion.

In a still another preferred embodiment of the present invention, the coupling agent to be incorporated in the second coating composition used for the second layer is a coupling agent having at least one functional group selected from the group consisting of an amino group, a —OH group, a —SH group and an epoxy group.

The magnetic recording medium of the present invention has a magnetic layer element having a multi-layer structure comprising at least two layers. Namely, the magnetic recording medium of the present invention has at least two magnetic layers comprising the first magnetic layer (lower layer) nearer the support and the second magnetic layer (upper layer) adjacent to the first layer and farther removed from the support than the first layer.

In the present invention, the epoxy group or polar group of the epoxy compound or the coupling group of the coupling agent used in the second magnetic layer is adsorbed by the surface of ferromagnetic fine powder and is reacted so that the epoxy compound or the coupling agent functions as a dispersant and the dispersibility of the ferromagnetic powder is thereby improved. As a result, the very excellent electromagnetic characteristics of ferromagnetic fine powder can be sufficiently exhibited after dispersion in a binder. The remaining epoxy group or functional group is firmly bonded to the binder so that the very high mechanical strength of the magnetic layer can be provided and high running durability against sliding engagement with a head can be exhibited.

Namely, the ferromagnetic fine powder is firmly bonded to the binder by the epoxy compound or the coupling agent contained in the second magnetic layer which is brought into direct contact with a recording head on which short wavelength signals are recorded. As a result, very high dispersibility, fillability and smoothness can be obtained, and the very high mechanical strength of the magnetic layer can be obtained and also excellent running durability against the sliding with a head can be achieved.

Further, the coating composition for the second magnetic layer is prepared by adding a portion of the binder, a portion of a solvent and the epoxy compound or the coupling agent to the ferromagnetic fine powder, then kneading the mixture; and thereafter adding the reminder of the binder and the solvent thereto and dispersing the mixture obtained. Alternatively, the ferromagnetic fine powder can be initially dispersed without binder wherein it is surface-treated with the epoxy compound or the coupling agent before a later kneading and dispersion in the binder. By the above methods, the dispersibility of ferromagnetic fine powder in the second magnetic layer can be further improved and high electromagnetic characteristics as well as excellent running durability can be obtained.

The polyisocyanate compounds conventionally used as hardening agents to enhance the mechanical strength of the magnetic layer can be used in the present invention. The remaining epoxy group or functional group of the epoxy compound or coupling agent bonded to the surface of ferromagnetic powder not only reacts with and is bonded to the binder, but also reacts with water in the system during kneading and dispersion to form —OH groups which bond to the polyisocyanate compound. As a consequence, the mechanical strength of the magnetic layer can be remarkably improved.

When the polar group of the low-molecular epoxy compound is bonded to the surface of ferromagnetic powder, the epoxy group thereof is spatially positioned toward the outward direction, whereby the surface of ferromagnetic fine powder is changed from hydrophilicity to lipophilicity, the affinity thereof with the binder is enhanced and kneading and dispersion rate can be increased. Further, epoxy group is reacted with —OH group in the binder and bonded to the binder during kneading and dispersion so that the amount of the binder bonded to ferromagnetic fine powder is greatly increased. Thus, dispersibility and dispersion stability can be remarkably improved. In this case, the epoxy group is reacted with water in the system to form a —OH group which is then bonded to the polyisocyanate compound. Hence, the mechanical strength of the magnetic layer after curing can be remarkably improved.

However, —OH group formed from the epoxy group or the coupling agent is readily reacted with isocyanate group (—NCO group) in the polyisocyanate compound, and the reaction takes place during kneading and dispersion in the preparation of the magnetic coating composition. Hence, the pot life of the magnetic coating composition prepared in the conventional manner is very short. The preparation of the magnetic recording medium is practically impossible by using such conventional combination of the compounds.

In the present invention, the coating composition for the second magnetic layer contains substantially no polyisocyanate compound, and only the coating composition for the first magnetic layer contains the polyisocyanate compound. The first and second magnetic layers are simultaneously coated, or the second magnetic layer is successively coated on the first magnetic layer while the wet state of the first magnetic layer still exists. When the second magnetic layer is coated on the first magnetic layer, the polyisocyanate compound in the first magnetic layer in the wet state is diffused in the second magnetic layer in a very short time before the solvent is dried, and the polyisocyanate compound is reacted with —OH group formed from the epoxy group or the remaining functional group of the coupling agent in the second magnetic layer, whereby the mechanical strength of the magnetic layer can be markedly improved. In addition, the problem with respect to very short pot life can be solved since the polyisocyanate and epoxy groups are not intermixed until coating of the magnetic layers. Namely, the addition of the hardening agent immediately before magnetic layer coating operations is investigated in the present invention.

In the present invention, the coating composition for the second magnetic layer contains substantially no polyisocyanate compound. The term "contain substantially no polyisocyanate compound" as used herein means that the coating solution may contain a very small amount of the polyisocyanate compound (less than 0.1 part by weight per 100 parts by weight of ferromagnetic fine powder) in such an amount that the viscosity of the coating solution is not increased by the presence of any polyisocyanate compound. It is preferred that the coating composition is completely free from the polyisocyanate compound. The coating solution for the first magnetic layer contains substantially no epoxy compound and substantially no coupling agent (i.e., in an amount of less than 0.1 part by weight per 100 parts by weight of ferromagnetic fine powder).

A magnetic recording medium having high electromagnetic characteristics as well as excellent running durability can be obtained by the present invention which cannot be obtained by conventional single magnetic layer type magnetic recording media.

The present invention will be illustrated in more detail below.

The epoxy compounds which can be used in the present invention include commercially available epoxy resins such as bisphenol A type epoxy resins, glycidylamine type epoxy resins, novolak type epoxy resins, bisphenol F type epoxy resins, glycidyl ester resins, resorcinyl diglycidyl ethers, alicyclic epoxy resins and aliphatic epoxy- resins. Also, ferromagnetic powder can be well dispersed by glycidyl methacrylate monomer or glycidyl phenyl ether. Epoxy resins having a molecular weight of not more than 1000 and epoxy equivalent of not higher than 200 eq/g are preferred.

Examples of the epoxy compounds which can be used in the present invention include compounds having the following chemical structures.

A. Bisphenol A type epoxy resins (or called epi-bis type epoxy resin) suitable for the present invention are represented by the following formula.

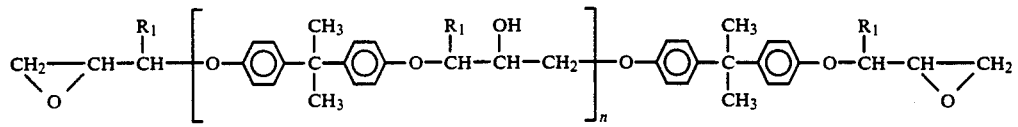

wherein
n=0-3.
$R_1$ = —H or —$CH_3$.

B. Glycidylamine type epoxy resins of the present invention are represented by the following formulae (1) to (3).

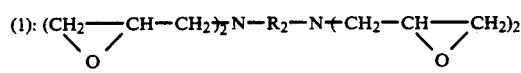

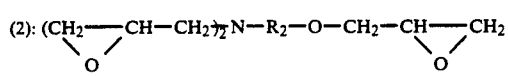

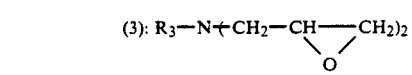

wherein
$R_2$=

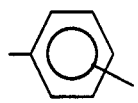

(o-, m-, p-),

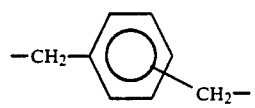

(o-, m-, p-),

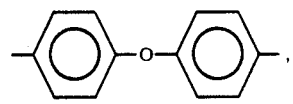

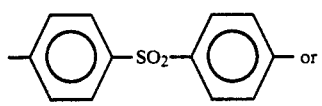
or

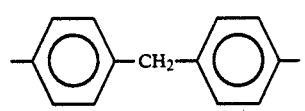

$R_3$=

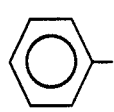

(or a hydrocarbon group having 4 to 24 carbon atoms.

C. Novolak type epoxy resins of the present invention are represented by the following formula.

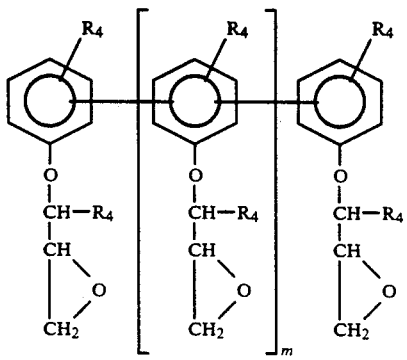

wherein
$R_4$ = —H or —$CH_3$.
m=0-10.

D. Bisphenol F type epoxy resins of the present invention are represented by the following formula.

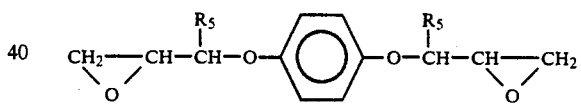

wherein, $R_5$ = —H or —$CH_3$.

E. Glycidyl ester resins of the present invention are represented by the following formula.

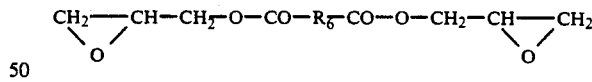

wherein $R_6$=

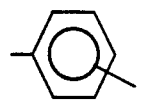

(o-, m-, p-),

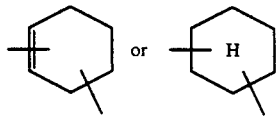

F. Resorcinyl diglycidyl ethers represented of the present invention are by the following formula.

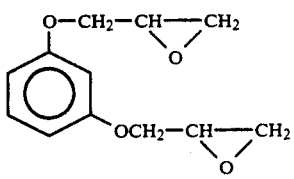

The above-described epoxy compounds have a molecular weight of preferably not more than 2000. When the molecular weight is more than 2000, the effect of improving the dispersibility of ferromagnetic fine powder is diminished and durability is apt to be deteriorated. Epoxy compounds having a molecular weight of not more than 1000 are particularly preferred. The epoxy equivalent of the epoxy compound is preferably not higher than 200 eq/g. When the epoxy equivalent is higher than 200 eq/g, the effect of improving dispersibility is diminished.

Preferred epoxy compounds which can be used in the present invention are amine type epoxy compounds with glycidyl amine type epoxy resins being particularly preferred.

Specific examples of the epoxy compounds include Epiols A, B, P, OH, M, EH, G-100, SB and TB (manufactured by Nippon Oils & Fats Co., Ltd.); YH-434, YH-434L, YDPN-638, YDCN-701S, YDCN-702S and YDCN-703S (manufactured by Toto Kasei KK); Epikote 801, 802, 807, 815, 825 and 828 (manufactured by Shell Corp.); GY 250, GY 257 and GY 260 (manuftrured by Ciba-Geigy AG) and ETRAD-X and TETRAD-C (products of Mitsubishi Gas Kagaku KK).

The low-molecular epoxy compounds having at least one epoxy group and at least one polar group per molecule are characterized by that the compounds have at least one epoxy group and at least one polar group selected from the group consisting of —$SO_3M$, —O$SO_3M$, —OPO(OM)$_2$, —PO(OM)$_2$ and —COOM (wherein M is an alkali metal or ammonium ion) in the molecule. Preferred polar groups are —$SO_3M$ and —PO(OM)$_2$. The reason why these groups are introduced into the compounds in salt form is that when these groups are used in the free form, there is a possibility that an increase in viscosity is caused when surface treatment or kneading with the binder is carried out.

Epoxy group can be introduced by conventional methods. For example, commercially available epoxy compounds can be used. Further, epoxy compounds can be synthesized by reacting an aliphatic alcohol or an aromatic phenol and an aliphatic amine or an aromatic amine with an epihalohydrin.

The polar groups such as —$SO_3M$, —O$SO_3M$, —OPO(OM)$_2$ and —PO(OM)$_2$ can be introduced into these compounds by conventional methods for synthesizing a salt of a sulfonic acid or a phosphonic acid. These polar groups may be introduced into the aliphatic alcohol, the aromatic alcohol, the aliphatic amine or the aromatic amine component by using these conventional methods before epoxy group is introduced into these alcohols or these amine components. As noted above, these low-molecular epoxy compounds have a molecular weight of not more than 2000, preferably not more than 1000. When the molecular weight is more than 2000, an effect of improving the dispersibility of ferromagnetic powder is lowered.

Examples of these compounds which can be used in the present invention include compounds having the following chemical structures.

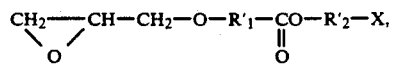

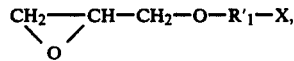

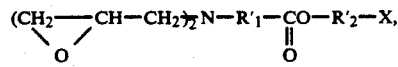

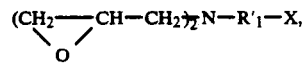

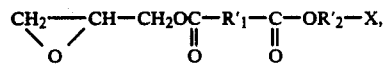

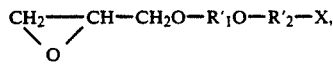

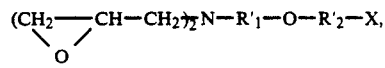

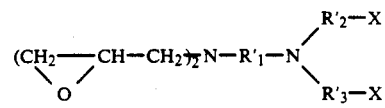

In the above formulae, $R'_1$, $R'_2$ and $R'_3$ represent each an aliphatic or aromatic group, and X represents a polar group such as —$SO_3M$, —O$SO_3M$, —OPO(OM)$_2$, —PO(OM)$_2$ or COOM.

The compounds having at least one epoxy group and at least one polar group may be prepared by copolymerizing a vinyl monomer with a vinyl compound having epoxy group and a vinyl compound having a —$SO_3M$, —O$SO_3M$, —OPO(OM)$_2$, —PO(OM)$_2$ or —COOM group.

Examples of the vinyl monomer include the following compounds.

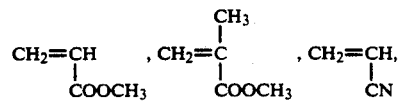

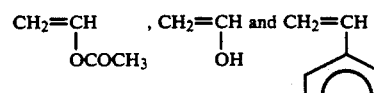 

Examples of the vinyl monomer having an epoxy group include the following compounds.

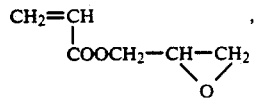

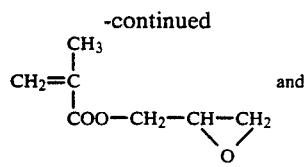

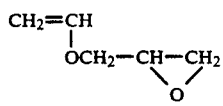

Examples of the vinyl monomer having a —SO₃M group include the following compounds.

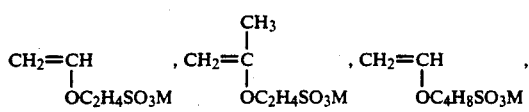

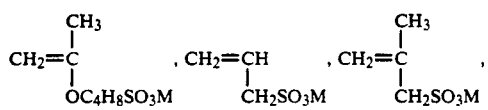

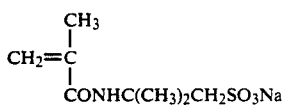

Examples of the vinyl monomer having a —OSO₃M group include the following compounds.

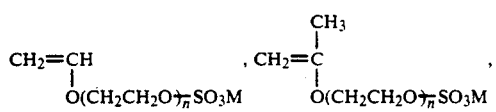

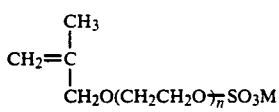

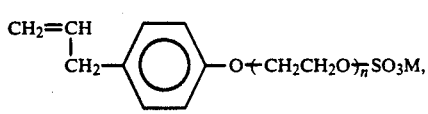

Examples of the vinyl monomer having —OPO(OM)₂ group include the following compounds.

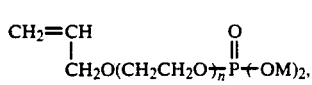

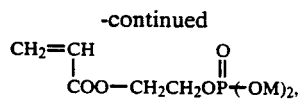

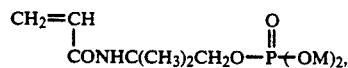

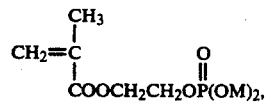

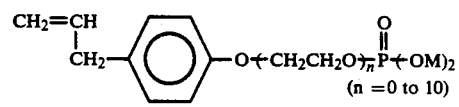

Examples of the vinyl monomer having —PO(OM)₂ group include the following compounds.

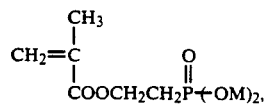

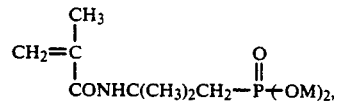

Examples of the vinyl monomer having —COOM group include the following compounds.

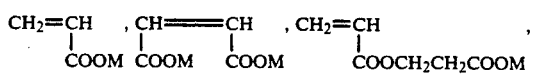

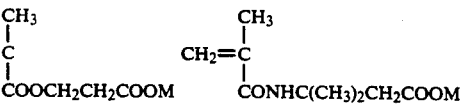

The coupling agents having at least one functional group which can be used in the present invention include silane coupling agents, titanium coupling agents, zirconium coupling agents and organic aluminum compounds, with these compounds having at least one functional group selected from the group consisting of an amino group, —OH group, —SH group and an epoxy group. Among these groups, an amino group and an epoxy group are preferred.

Specific examples of these coupling agents having at least one fundamental group include the following compounds.

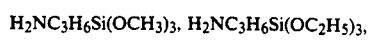

-continued

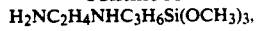
$H_2NC_2H_4NHC_3H_6Si(OCH_3)_3$,

$H_2NC_2H_4NHC_3H_6Si(CH_3)(OCH_3)_2$,

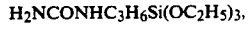
$H_2NCONHC_3H_6Si(OC_2H_5)_3$,

$(HOC_2H_4)_2NC_3H_6Si(OC_2H_5)_3$,

$HSC_3H_6Si(OC_2H_5)_3$,

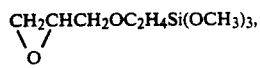

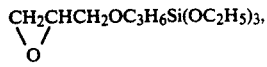

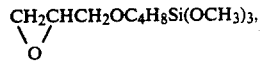

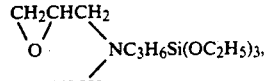

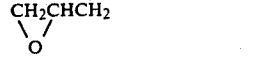

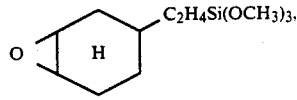

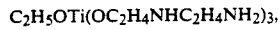
$C_2H_5OTi(OC_2H_4NHC_2H_4NH_2)_3$,

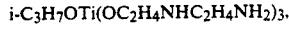
i-$C_3H_7OTi(OC_2H_4NHC_2H_4NH_2)_3$,

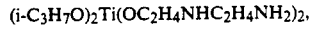
(i-$C_3H_7O)_2Ti(OC_2H_4NHC_2H_4NH_2)_2$,

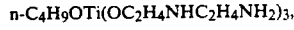
n-$C_4H_9OTi(OC_2H_4NHC_2H_4NH_2)_3$,

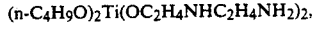
(n-$C_4H_9O)_2Ti(OC_2H_4NHC_2H_4NH_2)_2$,

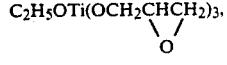

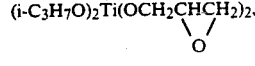

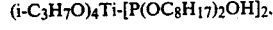
(i-$C_3H_7O)_4Ti$-$[P(OC_8H_{17})_2OH]_2$,

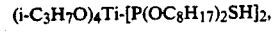
(i-$C_3H_7O)_4Ti$-$[P(OC_8H_{17})_2SH]_2$,

i-$C_3H_7OZr(OC_2H_4NHC_2H_4NH_2)_3$,

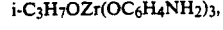
i-$C_3H_7OZr(OC_6H_4NH_2)_3$,

i-$C_3H_7OAl(OC_2H_4NHC_2H_4NH_2)_2$,

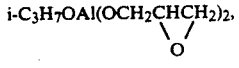

Among these compounds, the following readily available compounds are preferred.

$H_2NC_3H_6Si(OCH_3)_3$,

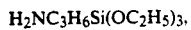
$H_2NC_3H_6Si(OC_2H_5)_3$,

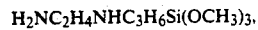
$H_2NC_2H_4NHC_3H_6Si(OCH_3)_3$,

-continued

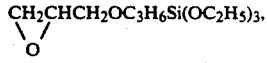

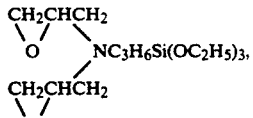

i-$C_3H_7OTi(OC_2H_4NHC_2H_4NH_2)_3$,

The above-described epoxy compounds or coupling agents are used in an amount of 0.1 to 10 parts by weight, preferably 0.1 to 5 parts by weight based on 100 parts by weight of ferromagnetic fine powder. Particularly, when the epoxy compounds or the coupling agents are used in the range of 0.15 to 4 parts by weight, the dispersion state of ferromagnetic fine powder is improved, for example, the glossiness of the surface of the magnetic layer is enhanced. More particularly, when these compounds are used in the range of 0.2 to 3.5 parts by weight per 100 parts by weight ferromagnetic powder, the characteristics of electromagnetic characteristics can be remarkably improved. When the amount is less than 0.1 part by weight, there is a possibility that the effect of the addition of the compounds cannot be obtained, while if the amount is more than 10 parts by weight, there is a possibility that the dispersion state of ferromagnetic fine powder cannot be further improved.

The polyisocyanate compounds used in the first magnetic layer of the present invention are chosen from polyisocyanate compounds conventionally used as hardening agents for polyurethane resins. Preferred examples of the polyisocyanate compounds include a reaction product of 3 mol of tolylene diisocyanate with 1 mol of trimethylol propane, a reaction product of 3 mol of xylylene diisocyanate or hexamethylene diisocyanate with 1 mol of trimethylol propane, a biuret addition compound of 3 mol of hexamethylene diisocyanate, an isocyanurate addition compound of 5 mol of tolylene diisocyanate, an isocyanurate addition compound of 3 mol of tolylene diisocyanate, and 2 mol of hexamethylene diisocyanate, and a polymer of isophorone diisocyanate and phenylmethane diisocyanate.

The polyisocyanate compounds used in the first magnetic layer are used in an amount of 2 to 10 parts by weight, preferably 4 to 8 parts by weight based on 100 parts by weight of ferromagnetic fine powder.

Ferromagnetic fine powders which can be used in the present invention include conventional ferromagnetic fine powders such as gamma-FeOx (x=1.33 to 1.5), Co-modified gamma-FeOx (x=1.33 to 1.5), fine chromium dioxide powder, ferromagnetic fine metal powders including Fe, Co or Ni, barium ferrite and strontium ferrite. These ferromagnetic fine powders may contain, in addition to the primary atoms, other atoms such as Al, Si, S, Sc, Ti, V, Cr, Cu, Y, Mo, Rh, Pd, Mg, Sn, Sb, Te, Ba, Ta, W, Re, Au, Hg, Pb, Bi, La, Ce, Pr, Nd, P, Co, Mn, Zn, Ni, Sr, and B. Though there is no particular limitation with regard to the shape of ferromagnetic powder, acicular or granular powder is generally used. With regard to the size of ferromagnetic powder, powders having a specific surface area of not larger than 45 m²/g as measured by BET method and a crystallite size of not smaller than 290 Å are used for the first magnetic layer, while powders having a specific surface area of not smaller than 30 m$^2$/g as measured by BET method and a crystallite size of not larger than 400 Å are used for the second magnetic layer. It is preferred that the specific surface area as measured by BET method of ferromagnetic fine powder used in the first magnetic layer is smaller than that of ferromagnetic fine powder used in the second magnetic layer, and the difference therebetween is larger than 5 m$^2$/g.

Powders having a crystallite size of not larger than 350 Å, particularly not larger than 250 Å are particularly effective as ferromagnetic fine powder used in the second magnetic layer of the present invention.

Ferromagnetic fine powders having any of an acidic pH and a basic pH are effective, but powders having a pH of 8 or higher are particularly effective.

The binders of the present invention can be chosen from among conventional binders. Examples of the binders include vinyl chloride copolymers (examples of comonomers which are preferred from the viewpoint of increasing solubility of the binder in solvents include fatty acid vinyl esters such as vinyl acetate and vinyl propionate, alkyl (meth)acrylates such as methyl acrylate, ethyl acrylate, propyl acrylate, lauryl acrylate, stearyl acrylate, methyl methacrylate and ethyl methacrylate and vinylidene chloride; examples of comonomers having —OH group which are preferred from the viewpoint of improving mechanical strength by the bonding thereof to the polyisocyanate compounds or the epoxy compounds include vinyl alcohol, hydroxyethyl (meth)acrylate, hydroxypropyl (meth)acrylate, hydroxybutyl (meth)acrylate, hydroxylauryl (meth)acrylate, hydroxystearyl (meth)acrylate, polyethylene glycol (meth)acrylate, polypropylene glycol (meth)acrylate, hydroxyethyl allyl ether and hydroxybutyl allyl ether; and examples of other comonomers which may be optionally used include maleic acid, (meth)acrylic acid, acrylonitrile, ethylene and styrene}; acrylic resins such as polymethyl methacrylate (examples of comonomers include those already described above for the comonomers used for the vinyl chloride copolymers); cellulosic resins such as nitrocellulose, cellulose acetate propionate and cellulose acetate butyrate; and polyvinyl acetal resins, polyvinyl butyral resins, epoxy resins, phenoxy resins, polyester polyurethane resins, polyether polyurethane resins, polyether-ester polyurethane resins, polycarbonate polyurethane resins, polyester resins, polyether resins and various rubber resins.

Preferred binders include vinyl chloride resins, acrylic resins, cellulosic resins, polyurethane resins, polyester resins and polyether resins.

Other preferred binder compounds are obtained by introducing one or more polar groups {e.g., —COOM, —SO$_3$M, —SO$_4$M, —PO$_3$M$_2$, —OPO$_3$M$_2$, amino group, ammonium base group, —OH, —SH and epoxy group (wherein M is hydrogen atom, an alkali metal or ammonium ion; and when two or more Ms' exist, they may be the same or different)} into the above-described binders to further enhance dispersibility and durability.

The content of the polar group is preferably $1 \times 10^{-7}$ to $1 \times 10^{-3}$ equivalent, more preferably $0.5 \times 10^{-5}$ to $60 \times 10^{-5}$ equivalent per gram of the binder when the polar group is —COOM, —SO$_3$M, —SO$_4$M, —PO$_3$M$_2$, —OPO$_3$M$_2$, amino group or ammonium base group. The content of the polar group is preferably $5 \times 10^{-5}$ to $200 \times 10^{-5}$ equivalents when the polar group is —OH, —SH or epoxy group. When the content is lower than the above lower limit, the effect obtained thereby is too small, while when the content is too large, solubility in the solvents is deteriorated and dispersibility is lowered.

These binders have a molecular weight (in terms of weight-average molecular weight) of preferably 10,000 to 100,000, more preferably 20,000 to 60,000.

Particularly preferred examples of the binders having at least one polar group include (1) polyurethane resins having at least three —OH groups and the above polar group other than an —OH group in an amount of $0.5 \times 10^{-5}$ to $60 \times 10^{-5}$ eq/g and (2) vinyl chloride or acrylic resins having an —OH group content of $5 \times 10^{-5}$ to $200 \times 10^{-5}$ eq/g, an epoxy group content of $0.5 \times 10^{-5}$ to $100 \times 10^{-5}$ eq/g, the above polar group other than an —OH group and an epoxy group in an amount of $0.5 \times 10^{-5}$ to $60 \times 10^{-5}$ eq/g, and a degree of polymerization of 200 to 600.

These binders may be used either alone or as a mixture of two or more thereof. The binders used in the first and second magnetic layers may be the same or different.

The amount of the entire binders used in each magnetic layer of the magnetic recording medium of the present invention is generally 10 to 100 parts by weight, preferably 15 to 40 parts by weight based on 100 parts by weight of total ferromagnetic powder.

It is preferred that further additives such as carbon black, abrasive agent and other conventional additives are used.

Examples of carbon black which can be used in the present invention include furnace black for rubber, thermal black for rubber and black for coloring and acetylene black.

It is preferred that carbon blacks having a specific surface area of 5 to 500 m$^2$/g, a DBP oil absorption rate of 10 to 400 ml/100 g, a particle size of 5 to 300 m$\mu$, a pH of 2 to 10, a water content of 0.1 to 10% and a tap density of 0.1 to 1 g/ml are used. The tap density can be measured in the following manner. Into a 100 ml messcylinder is placed 10 to 40 g of carbon black. The messcylinder is allowed to drop from the height of 3 cm by gravity. This is repeated 100 times. Thereafter, the volume is divided by the weight. The resulting value is referred to as the tap density.

Specific examples of carbon blacks which can be used in the present invention include BLACKPEARLS 200, 1300, 1000, 900, 800 and 700 and VULCAN XC-72 (produced by Cabot Co., Ltd.); #80, #60, #55, #50, and #35 (produced by Asahi Carbon Co., Ltd.); #2400B, #2300, #900, #1000, #30, #40, and #10B (produced by Mitsubishi Chemical Corporation); and CONDUCTEX SC, RAVEN 150, 50, 40, and 15 (produced by Columbia Carbon Co., Ltd.). Carbon black may be subjected to surface-treatment using dispersing agents, or may be grafted using resins. Carbon black in which a part of its surface is graphited may be used. Before carbon black is added to a magnetic coating composition, it may be dispersed in advance with binders.

Carbon blacks have functions capable of imparting antistatic properties, lowering a coefficient of friction, imparting light-shielding properties and increasing film strength. However, these functions vary depending on the kinds of carbon blacks to be used. Accordingly, carbon black can be properly used by changing the kind, amount and combination of carbon black used in the first and second magnetic layers according to purpose on the basis of the above-described characteristics such as particle size, oil absorption rate, electrical conductivity and pH. For example, carbon black having a high electrical conductivity can be used for the first magnetic layer to impart antistatic properties, an-d carbon black having a large particle size can be used for the second magnetic layer to lower coefficient of friction.

Examples of carbon black which can be used in the present invention are described in *Carbon Black Binran*, edited by Carbon Black Association.

It is preferred that carbon black contained in the first magnetic layer has an average particle size of smaller than 20 nm and is used in an amount of 1 to 20 parts by weight based on 100 parts by weight of ferromagnetic powder, and carbon black contained in the second magnetic layer has an average particle size of 40 to 80 nm and is used in an amount of 0.1 to 10 parts by weight based on 100 parts by weight of ferromagnetic powder.

Examples of abrasive agents which can be used in the present invention include known materials having a Mohs' hardness of 6 or higher such as alpha-alumina having an alpha-conversion of 90% or more, beta-alumina, silicon carbide, chromium oxide, cerium oxide, alpha-iron oxide, corundum, synthetic diamond, silicon nitride, silicon carbide, titanium carbide, titanium oxide, silicon dioxide and boron nitride. These abrasives can be used alone or in combination. A composite of such abrasive agents (i.e., abrasive agents treated with other abrasive agents) may be used. These abrasive agents may contain some compounds or elements other than the chief ingredient, and the effects of the abrasive agents remain unchanged if the chief ingredient is used in amount of 90% by weight or more.

The particle size of these abrasive agents is preferably 0.01 to 2 $\mu$m. If desired, abrasive agents having different particle sizes may be used in combination, or a single abrasive agent having a wider particle size distribution may be used to give an equivalent effect.

It is preferred that the abrasive agents have a tap density of 0.3 to 2 g/ml, a water content of 0.1 to 5%, a pH of 2 to 11, and a specific surface area of 1 to 30 $m^2/g$.

The abrasive agents which can be used in the present invention may any of acicular, spherical or die-like shapes. Abrasive agents in which a part of their shape presents an edge are preferably used, because the abrasive property thereof becomes enhanced.

Examples of the abrasive agents which can be used in the present invention include AKP-20, AKP-30, AKP-50, and HIT-50 produced by Sumitomo chemical Co., Ltd., G5, G7, S-1 produced by Nippon Chemical Industry Co., Ltd., 100ED, and 140ED produced by Toda Kogyo Co., Ltd.

The abrasive agents can be properly used by changing the kind, amount and combination of the abrasive agents used in the first and second magnetic layers according to purpose desired. For example, when the durability of the surface of the magnetic layer is to be improved, the amount of the abrasive agent used in the second magnetic layer is increased, while when the durability of the edge of the magnetic layer is to be improved, the amount of the abrasive agent used in the first magnetic layer is increased. It is preferred that the first magnetic layer contains an abrasive agent having a Mohs' hardness of less than 7 and the second magnetic layer contains an abrasive agent having a Mohs' hardness of 7 or higher.

These abrasive agents are preferably dispersed in advance with binders, and then may be added to a magnetic coating composition.

It is preferred that abrasive agents exposed in the surface as well as edge of the magnetic layers be present in an amount of 5 pieces/100 $\mu m^2$ or more.

In the present invention, additives which have lubricating effect, antistatic effect, dispersing effect, or plasticizing effect also can be used. Examples of such additives include molybdenum disulfide; tungsten disulfide; graphite; boron nitride; fluorinated graphite; silicone oils; silicones having polar groups; fatty acid-modified silicones; fluorine-containing silicones; fluorine-containing alcohols; fluorine-containing esters; polyolefines; polyglycols; alkylphosphoric acid esters and their alkali metal salts; alkyl sulfuric acid esters and their alkali metal salts; polyphenyl ethers; fluorine-containing alkyl sulfuric acid esters and their alkali metal salts; monobasic fatty acids having 10 to 24 carbon atoms (which may contain an unsaturated bond or may be branched) and their metal salts (e.g., salts of Li, Na, K, and Cu); monohydric, dihydric, trihydric, tetrahydric, pentahydric, and hexahydric alcohols having 12 to 22 carbon atoms (which may contain an unsaturated bond or may be branched); alkoxy alcohols having 12 to 22 carbon atoms; mono-fatty acid esters or di-fatty acid esters or tri-fatty acid esters, each consisting of monobasic fatty acid having 10 to 24 carbon atoms (which may contain an unsaturated bond or may be branched) and any one of monohydric, dihydric, trihydric, tetrahydric, pentahydric and hexahydric alcohols having 2 to 12 carbon atoms (which may contain an unsaturated bond or may be branched); fatty acid esters of mono-alkyl ethers of alkylene oxide polymers; fatty acid amides having 8 to 22 carbon atoms; and aliphatic amines having 8 to 22 carbon atoms.

Examples of such alcohols, acids, or esters include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

In addition, nonionic surface active agents can be used such as alkylene oxides, glycerines, glycidols, or alkylphenol ethylene oxide adducts; cationic surface active agents such as cyclic amines, ester amides, quaternary ammonium salts, hydantoin derivatives, heterocyclic compounds, or phosphonium or sulfonium compounds; anionic surface active agents having an acidic groups such as a carboxy group, sulfo group, phosphoric acid group, sulfuric acid ester group, or a phosphoric acid ester group; and amphoteric surface active agents such as amino acids, amino sulfonic acids, sulfuric or phosphoric esters of amino alcohols or alkyl betaines. Such surface active agents are disclosed in "Surface Active Agent Bihran" by Sangyo Tosho Co., Ltd.

These lubricating agents and antistatic agents need not be necessarily 100% pure, and may further contain impurities such as isomers, unreacted products, by-products, decomposed products, or oxides. The content of such impurities is preferably 30% or less, more preferably 10% or less.

These lubricating agents and surface active agents can be properly used by changing the kind and amount thereof used in the first and second magnetic layers according to purpose. For example, the first magnetic layer can contains a fatty acid having a melting point different from that of a fatty acid used in the second layer to thereby control the exudation thereof toward the surface of the magnetic layer. Similarly, esters having different boiling points or polarities are used to control the exudation thereof. Coating stability can be improved by controlling the amount of the surface active agent. Lubricating effect is improved by increasing the ratio of the lubricating agent to ferromagnetic powder in the first magnetic layer.

All or part of the additives which are used in the present invention may be added at any manufacturing stage. For example, the additives may be mixed with ferromagnetic fine powder before a kneading stage, or, instead, may be added during kneading of ferromagnetic fine powder, the binder and the solvent, or may be added for the dispersion stage, or may be added after the dispersion stage or immediately before coating.

Examples of lubricating agents which can be used in the present invention are commercially available under the trade names of NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil-cured fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, Butyl stearate, butyl laurate, and erucic acid (produced by Nippon Oils and Fats Co.); Oleic acid produced by Kanto Chemical Co., Ltd.; FAL-205, FAL-123 produced by Takemoto Yushi Co., Ltd.; Enujerubu LO, Enujerubu IPM, and Sansosyzer E4030 (produced by Shin Nihon Rika Co., Ltd.); TA-3, KF-96, KF-96L, KF-96H, KF-410, KF-420 KF-965, KF-54, KF-50, KF-56, KF-907, KF-851, X-22-819, X-22-822, KF-905, KF-700,-KF-393, KF-857, KF-860, KF-865, X-22-980, KF-101, KF-102, KF-103, X-22-3710, X-22-3715, KF-910, and KF-3935 (produced by Shin-Etsu Chemical Co., Ltd.); Armide P, Armide C, and Armoslip CP (produced by Lion Ahmer Co., Ltd.); Duomin TDO produced by Lion Fat and Oil Co., Ltd.; BA-41G produced by Nisshin Oil Mill Ltd.; Profan 2012E, Newpole PE61, Ionet MS-400, Ionet MO-200, Ionet DL-200, Ionet DS-300, Ionet DS-300, Ionet DS-1000, and Ionet DO-200 (produced by Sanyo Kasei Co., Ltd.).

It is preferred that the amount of the abrasive agent contained in the second magnetic layer is larger than the amount of the abrasive agent in the first magnetic layer.

Generally, the molecule of the fatty acid added as the lubricating agent is adsorbed on the surface of the magnetic layer and is orientated thereon, whereby the fatty acid functions as the lubricating agent. However, a part of the fatty acid is adsorbed by an active site on the surface of ferromagnetic fine powder. Hence, the whole molecule of the fatty acid added does not function effectively as the lubricating agent. Further, when an excess of the fatty acid is added, there is a disadvantage that the strength of the magnetic layer is lowered. Accordingly, the amount of the fatty acid to be added is limited.

In the present invention, however, the active site on the surface of ferromagnetic fine powder, by which the polar group of the low-molecular epoxy compound having a polar group and an epoxy group, according to the present invention is also adsorbed, is the same type of active site by which the fatty acid is adsorbed and orientated. Accordingly, the active site is blocked by the adsorbed polar group in the present invention so that the fatty acid is not adsorbed. Therefore, the whole molecule of the fatty acid added functions effectively as the lubricating agent, a coefficient of friction ($\mu$ value) on the surface of the magnetic recording medium is lowered and the running properties of the magnetic recording medium can be effectively improved.

Examples of organic solvents which can be used in arbitrary suitable proportions in the present invention include ketones such as acetone, methyl ethyl ketone, methyl isobutyl ketone, diisobutyl ketone, cyclohexanone and isophorone; alcohols such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethyl formamide; and hexane and tetrahydrofuran.

These organic solvents are not necessarily 100% pure, and may further contain impurities such as isomers, unreacted products, by-products, decomposed products, oxides, water, etc. The content of such impurities is preferably 30% by weight or less, more preferably 10% by weight or less.

The organic solvents may be different in the kind and amount thereof between the first and second magnetic layers, if desired. For example, more volatile solvents are used in the first magnetic layer to improve its surface properties. Solvents having high surface tension (e.g., cyclohexanone, dioxane) are used in the magnetic coating solution for the first magnetic layer in order to stabilize the coating. Solvents having a high solubility parameter are used in the magnetic coating composition for the second magnetic layer to enhance packing density.

In the magnetic recording medium of the present invention, the nonmagnetic support has a thickness of generally 1 to 100 $\mu$m, preferably 6 to 20 $\mu$m. The first magnetic layer has a thickness of generally 1.0 to 10 $\mu$m, preferably 1.5 to 5 $\mu$m. The second magnetic layer has a thickness of generally 4.0 $\mu$m or less, preferably 3.5 $\mu$m or less. The total thickness of the magnetic layers is generally 1/100 to 2 times that of the nonmagnetic support.

In order to increase adhesion between the non-magnetic support and the first magnetic layer, there may be formed an intermediate layer such as an undercoating layer or an antistatic layer, containing carbon black. The thickness of such intermediate layer is generally 0.01 to 2 $\mu$m, preferably 0.05 to 0.5 $\mu$m. A backing layer may be provided on the opposite surface of the nonmagnetic support. The thickness of the backing layer is generally 0.1 to 2 $\mu$m, preferably 0.3 to 1.0 $\mu$m. Suitable intermediate layers and backing layers can be selected from conventional ones.

Examples of the nonmagnetic suuports used in the present invention include a film made of conventional materials such as polyesters (e.g., polyethylene terephthalate, polyethylene naphthalate), polyolefins, cellulose triacetate, polycarbonate, polyamide, polyimide, polyamide-imide, and polysulfone. These supports may be subjected in advance to corona-discharge treatment, plasma treatment, adhesion treatment, heating treatment, dust removing treatment, etc.

The nonmagnetic support used in the present invention has a center line average surface roughness (Ra) of generally 0.03 µm or less, preferably 0.02 µm or less, more preferably 0.01 µm or less, and has a cut-off value of 0.25 mm. It is preferred that such nonmagnetic support has a small center line average surface roughness, and also does not have a coarse protrusion of 1 µm or more. The shape of the support surface roughness can be controlled by adjusting the amount and size of fillers which are added to the support, if desired. Examples of such fillers include oxides or carbonates of Ca, Si, Ti, and organic particles such as acrylic resins.

The F-5 value (i.e., stress at 5% elongation in the tensile test of the base film) of the nonmagnetic support in the tape-running direction is preferably 5 to 50 Kg/mm$^2$, and the F-5 value of it in the tape-width direction is preferably 3 to 30 Kg/mm$^2$. The F-5 value in the tape-running direction is usually larger than that in the tape-width direction; however, if desired; the strength in the tape-width direction may be larger than that in the tape-running direction.

The heat shrinkage rate of the magnetic support in the tape-running as well as tape-width direction at 100° C. for 30 minutes is preferably 3% or less, more preferably 1.5% or less. The heat shrinkage rate at 80° C. for 30 minutes is preferably 1% or less, more preferably 0.5% or less. It is preferred that the breaking strength of the non-magnetic support in both directions is preferably 5 to 100 Kg/mm$^2$, and the modulus of elasticity is preferably 100 to 2000 Kg/mm$^2$.

A method for manufacturing the magnetic recording medium of the present invention will be illustrated below.

The manufacturing stage of the magnetic coating solution (composition) of the present invention comprises at least a kneading step (i.e., a mixing step) and a dispersion step, and if desired, a mixing step which is conducted before or after these steps. Each of such steps may be separated into two or more steps.

Conventional manufacturing techniques can be used as a part of the manufacturing stages of the present invention to attain the object of the present invention. It is preferred that a device having a strong kneading power such as open kneader, pressure kneader or continuous kneader is used.

Particularly, when the magnetic coating composition for the second magnetic layer is prepared, it is preferred that the epoxy compound or the coupling agent and all or a part of the binder and the solvent are added to ferromagnetic fine powder and the mixture is vigorously kneaded. In this case, the epoxy group of the epoxy compound or the coupling group of the coupling agent is bonded to the surface of ferromagnetic fine powder and the binder by shearing and heat generated by shearing action. The remainders of the binder and the solvent are gradually added thereto to thereby dilute the mixture and disperse them, thus preparing a coating composition having a suitable viscosity so that coating can be properly carried out. The coating composition prepared in the manner described above has very high dispersibility.

Alternatively, ferromagnetic fine powder and the epoxy compound or the coupling agent are previously mixed with the solvent and dispersed. The solvent is then evaporated. The resulting ferromagnetic fine powder having already surfaces treated with the epoxy compound or the coupling agent is then kneaded and dispersed with binder and solvent in the above-described manner, whereby a magnetic coating composition can also be prepared by this alternative embodiment.

The coating composition for the first magnetic layer can be prepared by carrying out kneading and dispersion stages in the same manner for the second magnetic layer described above except that the epoxy compound or the coupling agent is omitted. It is preferred that the polyisocyanate compound is added immediately before performing the coating after the dispersion stage.

Other materials may be added at various manufacturing stages according to conventional practices.

The coating stage of the present invention can be accomplished by using a simultaneous or successive muliple layered coating method (wet-on-wet coating method) described in JP-A-62-212933. The low-molecular epoxy compound is diffused between the first and second magnetic layers while the layers are in the wet state. Hence, the polyisocyanate compound in the first magnetic layer is diffused in and mixed with the second magnetic layer during the course of coating to drying. Therefore, the epoxy compound or the coupling agent and the binder are bonded to the polyisocyanate compound and hardened in the second magnetic layer, whereby a coating film having very high mechanical strength can be formed.

While the embodiment using the first and second magnetic layers has been illustrated above, other layers may exist or may be interposed therebetween, so long as said layer does not have an adverse effect on the diffusion and mixing of the prsent invention. For example, another magnetic layer or non-magnetic layer may be interposed between the first and second magnetic layers. Also, the first magnetic layer and the second magnetic layer may be composed of a plurality of magnetic layers. Additionally, another magnetic layer or non-magnetic layer may be provided on the second magnetic layer.

When the magnetic recording medium is used in the form of a tape, the magnetic layer coated on the nonmagnetic support is generally subjected to a treatment for orientating ferromagnetic powder in the magnetic layer, i.e., a magnetic field orientation treatment, and then dried. If desired, the thus-obtained magnetic recording medium is subjected to a surface-smoothing treatment, or the like, and cut into desired shapes.

The magnetic recording medium of the present invention is excellent in electromagnetic characteristics as well as in running properties and durability. For example, when it is used as video tape, it has a high reproduction output and exhibits good running properties and good durability even under severe conditions such as high temperature and humidity conditions. In contrast, when the epoxy compound or the coupling agent is used in combination with the polyisocyanate compound in the preparation of conventional single magnetic layer type magnetic recording media, a coating solution containing a mixture of them must ultimately be prepared so that the pot life of the solution is very short and problems of a rise in viscosity, etc. are caused even when one of the above compounds is not added until immediately before coating. Hence, the conventional single magnetic layer type magnetic recording media cannot obtain a magnetic recording medium having excellent characteristics unlike that of the magnetic recording medium of the present invention and also production yield is low with the conventional arrangement.

The present invention will be illustrated in more detail by the following example and comparative examples. In the Examples, parts are by weight unless otherwise stated.

EXAMPLE I-1

Magnetic coating compositions were prepared by the following formulations.

| (1) Magnetic Coating Composition for the First Magnetic Layer | |
|---|---|
| Co-modified gamma-$Fe_2O_3$ (Hc = 650 Oe, specific surface area ($S_{BET}$) = 30 $m^2/g$) | 100 parts |
| Vinyl chloride copolymer ($-SO_3Na$ group content = $6 \times 10^{-5}$ eq/g, $-OH$ group content = $40 \times 10^{-5}$ eq/g, glycidyl group content = $20 \times 10^{-5}$ eq/g, vinyl chloride content = 86 wt %, a degree of polymerization = 260) | 12 parts |
| Polyester polyurethane ($-SO_3Na$ group content = $8 \times 10^{-5}$ eq/g. $-OH$ group content = $10 \times 10^{-5}$ eq/g. weight-average molecular weight = 30,000) | 8 parts |
| Methyl ethyl ketone | 20 parts |
| Toluene | 20 parts |
| Cyclohexanone | 20 parts |

The above ingredients were kneaded in an open kneader (manufactured by Moriyama Seisakusho).

Further, the following ingredients were added thereto and dispersion was conducted by using a sand grinder.

| Carbon black (average particle size: 80 nm) | 2 parts |
|---|---|
| Stearic acid | 2 parts |
| Tridecyl stearate | 2 parts |
| Methyl ethyl ketone | 100 parts |
| Toluene | 150 parts |
| Cyclohexanone | 50 parts |

To the resulting dispersion were added 5 parts by weight of polyisocyanate (Coronate L manufactured by Nippon Polyurethane Co., Ltd.) and 20 parts by weight of methyl ethyl ketone. The mixture was mixed to obtain a coating composition for the first magnetic layer.

| (2) Coating Composition for the Second Magnetic Layer | |
|---|---|
| Co-modified gamma-$Fe_2O_3$ (Hc = 7000 Oe, specific surface area ($S_{BET}$) = 45 $m^2/g$) | 100 parts |
| Tetrafunctional glycidylamine compound (TETRAD-C manufactured by Mitsubishi Gas Kagaku KK) (Glycidylamine type epoxy resins of the present invention) | 1 part |
| Vinyl chloride copolymer ($-SO_3Na$ group content = $6 \times 10^{-5}$ eq/g, $-OH$ group content = $20 \times 10^{-5}$ eq/g, glycidyl group content = $4 \times 10^{-5}$ eq/g, vinyl chloride content = 86 wt % a degree of polymerization = 380) | 12 parts |
| Alpha-$Al_2O_3$ (Average particle size: 0.08 $\mu m$) | 5 parts |
| Polyester polyurethane ($-SO_3Na$ group content = $8 \times 10^{-5}$ eq/g. $-OH$ group content = $10 \times 10^{-5}$ eq/g, weight-average molecular weight = 60,000) | 8 parts |
| Methyl ethyl ketone | 10 parts |
| Toluene | 10 parts |

| -continued | |
|---|---|
| (2) Coating Composition for the Second Magnetic Layer | |
| Cyclohexanone | 10 parts |

The above ingredients were kneaded in a pressure kneader. Further, the following ingredients were added thereto and dispersion was carried out by using a sand grinder to obtain a magnetic coating composition for the second magnetic layer.

| Stearic acid | 2 parts |
|---|---|
| Tridecyl stearate | 2 parts |
| Carbon black (average particle size: 40 nm) | 2 parts |
| Methyl ethyl ketone | 100 parts |
| Toluene | 150 parts |
| Cyclohexanone | 50 parts |

The resulting coating composition for the first magnetic layer was coated on a polyethylene terephthalate support of 15 $\mu m$ in thickness in such an amount as to give a dry thickness of 3.0 $\mu m$. The coating was carried out by means of reverse roll coating. While the first magnetic layer was still wet, the coating composition for the second magnetic layer was coated thereon in such an mount as to give a dry thickness of 0.5 $\mu m$ for the second magnetic layer. The coating was carried out by means of reverse roll coating. The resulting coated product was subjected to an orientation treatment with a magnet. After drying, it was supercalendered and slit into tapes of ½ inch in width to prepare video tape.

EXAMPLE I-2

The same procedure an in Example I-1 was repeated except that a vinyl chloride copolymer ($-COOH$ group content = $60 \times 10^{-5}$ eq/g, $-OH$ group content = $100 \times 10^{-5}$ eq/g, vinyl chloride content = 86 wt %, a degree of polymerization = 300) was used in place of the vinyl chloride copolymer used for the first magnetic layer of Example I-1 to prepare a video tape.

EXAMPLE I-3

The same procedure as in Example I-1 was repeated except that a vinyl chloride copolymer ($-OPO_3H_2$ group content = $60 \times 10^{-5}$ eq/g, $-OH$ group content = $100 \times 10^{-5}$ eq/g, vinyl chloride content = 86 wt %, a degree of polymerization = 200) was used in place of the vinyl chloride copolymer used for the second magnetic layer of Example I-1 to prepare a video tape.

EXAMPLE I-4

The same procedure as in Example I-1 was repeated except that a polyester polyurethane ($-COOH$ group content = $5 \times 10^{-5}$ eq/g, $-OH$ group content = $20 \times 10^{-5}$ eq/g, weight-average molecular weight = 40,000) was used in place of the polyester polyurethane used for the second magnetic layer of Example I-1 to prepare a video tape.

EXAMPLE I-5

The same procedure as in Example I-1 was repeated except that a polyether polyurethane (having no polar group, weight-average molecular weight = 30,000) was used in place of the polyester polyurethane used for the first magnetic layer of- Example I-1 to prepare a video tape.

EXAMPLE I-6

The same procedure as in Example I-1 was repeated except that an epoxy compound (YH434 produced by Toto Kasei KK) (Glycidylamine type epoxy resins of the present invention) was used in place of the epoxy compound used for the second magnetic layer of Example I-1 to prepare a video tape.

EXAMPLE I-7

The same procedure as in Example I-1 was repeated except that the epoxy compound, i.e., the glycidylamine compound, was introduced before the kneading stage in the preparation of the coating composition for the second magnetic layer in such a manner that the epoxy compound and ferromagnetic fine powder were mixed with 500 parts of methyl ethyl ketone per 100 parts of ferromagnetic fine powder, the mixture was stirred, the solvent was separated, the residue was dried and the kneading stage was then carried out by using the resulting surface-treated ferromagnetic fine powder. Then, the above coating protocol was used to prepare a video tape.

COMPARATIVE EXAMPLE I-1

The same procedure as in Example I-1 was repeated except that the epoxy compound was omitted in the preparation of the coating composition for the second magnetic layer to prepare a video tape.

COMPARATIVE EXAMPLE I-2

The same procedure as in Example I-1 was repeated except that the polyisocyanate compound was omitted in the preparation of the coating composition for the first magnetic layer to prepare a video tape.

COMPARATIVE EXAMPLE I-3

After dispersion, 5 parts of polyisocyanate compound was added to the coating composition of Example I-1 for the second magnetic layer.

The viscosity of the coating composition was examined for the second magnetic layers in the above examples.

Evaluation was made in the following manner by using the resulting coating composition and video tape. The results are shown in Table I-1.

(1) Pot life of coating composition for the second magnetic layer

After the preparation of the coating composition, a change in the viscosity with the passage of time was measured with Brookfield type viscometer while stirring at 23° C.

The coating composition was coated by using an applicator in such an amount as to give a dry thickness of 3 μm. The surface of the coat was examined with a microscope. The symbol G means that the concave and convex portions were not observed on the surface, and the symbol B means that the concave and convex portions were observed on the surface.

(2) Video output

RF output was determined by using VTR AG6800 (manufactured by Matsushita Electric Industrial Co., Ltd.). The value of each sample is represented by relative value with the value of the sample of Comparative Example I-1 referred to as the benchmark of ±0.0 dB.

(3) Loss of output

A loss in RF output was measured after 200 running passes were repeatedly made under fixed environmental conditions (40° C., 80% RH) over a period of 60 minutes by using the aforesaid VTR.

TABLE I-1

Pot Life of Coating Composition for the Second Magnetic Layer

| | Brookfield Viscosity (Ps) of Coating Composition | | | Surface Property of Magnetic Layer | | |
|---|---|---|---|---|---|---|
| | After 0 hr | After 4 hrs | After 8 hrs | After 0 hr | After 4 hrs | After 8 hrs |
| Example I-1 | 65 | 67 | 67 | G | G | G |
| " I-2 | 65 | 6 | 67 | G | G | G |
| " I-3 | 60 | 62 | 65 | G | G | G |
| " I-4 | 62 | 62 | 66 | G | G | G |
| " I-5 | 65 | 67 | 67 | G | G | G |
| " I-6 | 58 | 62 | 67 | G | G | G |
| " I-7 | 66 | 68 | 68 | G | G | G |
| Comp. Ex. I-1 | 70 | 78 | 83 | G | G | G |
| " I-2 | 65 | 67 | 67 | G | G | G |
| " I-3 | 70 | 99 | 189 | G | B | B |

| | Video Output (dB) | Loss of Output (dB) |
|---|---|---|
| Example I-1 | +1.3 | −0.3 |
| " I-2 | +1.1 | −0.2 |
| " I-3 | +1.0 | −0.3 |
| " I-4 | +1.5 | −0.2 |
| " I-5 | +1.3 | −0.4 |
| " I-6 | +1.4 | −0.3 |
| " I-7 | +1.0 | −0.3 |
| Comp. Ex. I-1 | ±0.0 | −2.7 |
| " I-2 | +0.8 | −3.5 |
| " I-3 | (Coating could not be made and no sample could not be obtained.) | |

It is apparent from the results of Table I-1 that the magnetic recording media of the present invention have excellent video characteristics and experience minimal loss in output after repeated running. For example, when the magnetic recording media of the present invention are used as video tapes, they have a high reproduction output and exhibit good running properties and good durability even under severe conditions such as high temperature and high humidity conditions. When the epoxy compound is used in combination with the polyisocyanate compound in the preparation of conventional single magnetic layer type magnetic recording media, a coating composition containing a mixture necessarily must be prepared before coating. Accordingly, pot life is very short even when one of these compounds is added immediately before coating and the problem of undue viscosity and related problems arise so that a magnetic recording medium having excellent characteristics cannot be obtained unlike the magnetic recording medium of the present invention has, and production yield is low in the conventional single layer arrangement.

EXAMPLE II-1

Magnetic coating compositions were prepared in the following manner by using the following formulations.
(1) Coating Composition for the First Magnetic Layer
 The same coating composition as that of Example I-1 for the first magnetic layer was prepared.
(2) Coating Composition for the Second Magnetic Layer
 The procedure of Example I-1 was repeated except that the compound having an epoxy group and a polar group indicated in Table II-1 hereinafter was used in place of the tetrafunctional glycidylamine compound used in the preparation of the coating composition for the second magnetic layer in Example I-1.

The coating composition for the first magnetic layer and the coating composition for the second magnetic layer were coated in the same manner as in Example I-1 to prepare a video tape.

EXAMPLE II-2

The same procedure as in Example II-1 was repeated except that a vinyl chloride copolymer (—COOH group content = $60 \times 10^{-5}$ eq/g, —OH group content = $100 \times 10^{-5}$ eq/g, vinyl chloride content = 86 wt %, a degree of polymerization = 300) was used in place of the vinyl chloride copolymer used for the first magnetic layer of Example II-1 to prepare a video tape.

EXAMPLE II-3

The same procedure as in Example II-1 was repeated except that a vinyl chloride copolymer (—OPO$_3$H$_2$ group content = $60 \times 10^{-5}$ eq/g, —OH group content = $100 \times 10^{-5}$ eq/g, vinyl chloride content = 86 wt %, a degree of polymerization = 200) was used in place of the vinyl chloride copolymer used for the second magnetic layer of Example II-1 to prepare a video tape.

EXAMPLE II-4

The same procedure as in Example II-1 was repeated except that a polyether polyurethane (—COOH group content = $5 \times 10^{-5}$ eq/g, —OH group content = $20 \times 10^{-5}$ eq/g, weight-average molecular weight = 40,000) was used in place of the polyester polyurethane used for the second magnetic layer of Example II-1 to prepare a video tape.

EXAMPLE II-5

The same procedure as in Example II-1 was repeated except that a polyester polyurethane (having no polar group, weight-average molecular weight = 30,000) was used in place of the polyester polyurethane used for the first magnetic layer of Example II-1 to prepare a video tape.

EXAMPLES II-6 AND II-7

The same procedure as in Example II-1 was repeated except that the compounds indicated in Table II-1 were used in place of the low-molecular epoxy compound having an epoxy group and a polar group used for the second magnetic layer of Example II-1 to prepare a video tapes.

EXAMPLE II-8

The same procedure as in Example II-1 was repeated except that the low molecular compound having an epoxy group and a polar group was used before the kneading stage in the preparation of the coating composition for the second magnetic layer in such a manner that the low-molecular compound having an epoxy group and a polar group and ferromagnetic fine powder were mixed with 500 parts of methyl ethyl ketone per 100 parts of ferromagnetic fine powder, the mixture was stirred, the solvent was separated, the residue was dried and the kneading stage was carried out by using the resulting surface-treated ferromagnetic fine powder to prepare a composition for coating and making a video tape.

COMPARATIVE EXAMPLE II-1

The same procedure as in Example II-1 was repeated except that the low-molecular epoxy compound having epoxy group and polar group used for the second magnetic layer was omitted to prepare a video tape.

COMPARATIVE EXAMPLE II-2

The same procedure as in Example II-1 was repeated except that the polyisocyanate compound used for the first magnetic layer was omitted to prepare a video tape.

COMPARATIVE EXAMPLE II-3

After dispersion, 5 parts of polyisocyanate compound was added to the coating composition of Example II-1 for the second magnetic layer.

The viscosity of the coating composition was examined for the second magnetic layers in the Example II series of magnetic recording media.

Evaluation was made in the following manner by using the respective resulting coating composition and video tape. The results are shown in Table II-1.

(1) Pot life of coating composition for the second magnetic layer

Measurement and evaluation were made in the same manner as in Examples I-1 to I-7 and Comparative Examples I-1 to I-3.

(2) Video output

RF output was determined by using VTR AG6800 (manufactured by Matsushita Electric Industrial Co., Ltd.). The value of each sample is represented by relative value when the value of the sample of Comparative Example II-1 is referred to as 0 dB.

(3) Loss of output

Measurement and evaluation were made in the same manner as in Examples I-1 to I-7 and Comparative Examples I-1 to I-3.

(4) μ Value

The surface of the magnetic layer of a sample tape was brought into contact with a stainless steel ball at a wrapping angle of 180° under a tension ($T_1$) of 50 g at 23° C. and 70% RH, and a tension ($T_2$) required for running the sample tape at a speed of 3.3 cm/sec was measured. The value was determined by the following formula.

$$\mu = \frac{1}{\pi} \ln (T_2/T_1)$$

TABLE II-1

| Compound having epoxy group and polar group |
|---|
| Example II-1 to 5: CH$_2$CHCH$_2$(OCH$_2$CH$_2$)$_4$OC—⟨◯⟩—SO$_3$Na with epoxy \O/ and C=O |
| Example II-6: (CH$_2$CHCH$_2$\O/)$_2$NCH$_2$—⟨◯⟩—P(=O)(OK)OK |
| Example II-7: (CH$_2$CHCH$_2$\O/)$_2$NCH$_2$CH$_2$O—⟨◯⟩—COOLi |

TABLE II-2

Pot Life of Coating Composition for the Second Magnetic Layer

| | Brookfield Viscosity (Ps) of Coating Composition | | | Surface Properties | | |
|---|---|---|---|---|---|---|
| | After 0 hr | After 4 hrs | After 8 hrs | After 0 hr | After 4 hrs | After 8 hrs |
| Example II-1 | 65 | 67 | 67 | G | G | G |
| " II-2 | 65 | 67 | 67 | G | G | G |
| " II-3 | 60 | 62 | 65 | G | G | G |
| " II-4 | 62 | 62 | 66 | G | G | G |
| " II-5 | 65 | 67 | 67 | G | G | G |
| " II-6 | 58 | 62 | 67 | G | G | G |
| " II-7 | 66 | 68 | 68 | G | G | G |
| " II-8 | 55 | 59 | 62 | G | G | G |
| Comp. Ex. II-1 | 70 | 7.8 | 83 | G | G | G |
| " II-2 | 65 | 67 | 67 | G | G | G |
| " II-3 | 70 | 120 | 256 | G | B | B |

| | Video Output (dB) | Loss of Output (dB) | μ Value |
|---|---|---|---|
| Example II-1 | +1.4 | −0.2 | 0.28 |
| " II-2 | +1.3 | −0.2 | 0.29 |
| " II-3 | +1.5 | −0.1 | 0.29 |
| " II-4 | +1.3 | −0.3 | 0.30 |
| " II-5 | +1.4 | −0.1 | 0.28 |
| " II-6 | +1.1 | −0.2 | 0.30 |
| " II-7 | +1.2 | −0.3 | 0.29 |
| Comp. Ex. II-1 | ±0.0 | −3.8 | 0.43 |
| " II-2 | +0.8 | −3.3 | 0.31 |
| " II-3 | (Coating could not be made and no sample could not be obtained.) | | |

It is apparent from the results of Table II-2 that the magnetic recording media of the present invention have excellent video characteristics and experience minimal loss in output after repeated running. For example, when the present recording media are used as video tapes, they have a high reproduction output and exhibit good running properties and good durability even under severe conditions such as high temperature and high humidity conditions. When the epoxy compound is used in combination with the polyisocyanate compound in the preparation of conventional single magnetic layer type magnetic recording media, a coating composition containing a mixture must necessarily be prepared before coating. Accordingly, pot life is practically very short even when one of these compounds is added immediately before coating and the problem of a rise in viscosity, etc., are caused so that a magnetic recording medium having excellent characteristics cannot be obtained unlike the magnetic recording medium of the present invention has, and production yield is low for the conventional arrangement.

EXAMPLES III-1 TO III-6

Magnetic coating compositions were prepared in the following formulations.

| (1) Coating Composition for the First Magnetic Layer | |
|---|---|
| Co-modified gamma-Fe2O3 (Hc = 650 Oe, specific surface area ($S_{BET}$) = 38 m$^2$/g) | 100 parts |
| Vinyl chloride copolymer (—SO$_3$Na group content = 6 × 10$^{-5}$ eq/g, —OH group content = 20 × 10$^{-5}$ eq/g, glycidyl group content = 4 × 10$^{-5}$ eq/g, vinyl chloride content = 86 wt % a degree of polymerization = 380) | 12 parts |
| Polyester polyurethane (—SO$_3$Na group content = 8 × 10$^{-5}$ eq/g, —OH group content = 10 × 10$^{-5}$ eq/g, Mw = 60,000) | 8 parts |
| Methyl ethyl ketone | 10 parts |
| Toluene | 10 parts |
| Cyclohexanone | 10 parts |

The above ingredients were kneaded in a pressure kneader. Further, the following ingredients were added thereto, and dispersion was carried out by using a sand grinder.

| | |
|---|---|
| Carbon black (average particle size: 40 nm) | 2 parts |
| Stearic acid | 2 parts |
| Tridecyl stearate | 2 parts |
| Methyl ethyl ketone | 100 parts |
| Toluene | 150 parts |
| Cyclohexanone | 50 parts |

To the dispersion were added 5 parts of polyisocyanate (Coronate L produced by Nippon Polyurethane Co., Ltd.) and 20 parts of methyl ethyl ketone, and the mixture was mixed to obtained a coating composition for the first magnetic layer.

| (2) Coating Composition for the Second Magnetic Layer | |
|---|---|
| Co-modified gamma-Fe$_2$O$_3$ (Hc = 700 Oe, specific surface area ($S_{BET}$) = 48 m$^2$/g) Coupling agent Indicated in Table III-1 | 100 parts |
| Vinyl chloride copolymer (—SO$_3$Na group content = 6 33 10$^{-5}$ eq/g, —OH group content = 40 33 10$^{-5}$ eq/g, glycidyl group content = 20 33 10$^{-5}$ eq/g, vinyl chloride content = 86 wt % a degree of polymerization = 260) | 12 parts |
| Polyester polyurethane (—SO$_3$Na group content = 8 × 10$^{-5}$ eq/g, —OH group content = 10 33 10$^{-5}$ eq/g, Mw = 30,000) | 8 parts |
| Methyl ethyl ketone | 20 parts |
| Toluene | 20 parts |
| Cyclohexanone | 20 parts |

The above ingredients were kneaded in an open kneader (produced by Moriyama Seisakusho). Further, the following ingredients were added thereto, and dispersion was carried out by using a sand grinder to obtain a coating composition for the second magnetic layer.

| | |
|---|---|
| Carbon black (average particle size: 80 nm) | 2 parts |
| Stearic acid | 2 parts |
| Tridecyl stearate | 2 parts |
| Methyl ethyl ketone | 100 parts |
| Toluene | 150 parts |
| Cyclohexanone | 50 parts |

The coating composition for the first magnetic layer was coated on a polyethylene terephthalate support having a thickness of 15 μm in such an amount as to give a dry thickness of 3.0 μm. The coating was carried out by means of reverse roll coating. While the first magnetic layer was still wet, the coating composition for the second magnetic layer was then coated thereon in such an amount as to give a dry thickness of 0.5 μm for the second magnetic layer. The coating was carried out by means of reverse roll coating. The coated product was subjected to an orientation treatment with a magnet. After drying, it was supercalendered and slit into tapes of ½ inch in width to prepare video tape.

EXAMPLE III-7

The same procedure as in Example III-1 was repeated except that in the preparation of the coating composition for the second magnetic layer, the coupling agent and ferromagnetic fine powder were mixed with 500 parts of methyl ethyl ketone per 100 parts of ferromagnetic fine powder, the mixture was stirred, the solvent was separated, the residue was dried to obtain ferromagnetic fine powder whose surface was treated, and the kneading stage was carried out without further adding a coupling agent by using the resulting treated ferromagnetic fine powder.

COMPARATIVE EXAMPLE III-1

The same procedure as in Example III-1 was repeated except that the coupling agent used for the second magnetic layer was omitted to prepare a video tape.

COMPARATIVE EXAMPLE III-2

The same procedure as in Example III-1 was repeated except that the polyisocyanate compound used for the first magnetic layer was omitted to prepare a video tape.

COMPARATIVE EXAMPLES III-3 TO III-9

After dispersion, 5 parts of polyisocyanate compound was added to each of the coating composition of Examples III-1 to III-6 for the second magnetic layer.

The pot life of the second magnetic layer coating compositions was examined.

TABLE III-1

| | Coupling Agent | Amount Added or Treated |
|---|---|---|
| Example III-1 | $H_2NC_3H_6Si(OC_2H_5)_3$ | 2 parts |
| Example III-2 | $CH_2CHCH_2OC_3H_6Si(OC_2H_5)_3$ with epoxide O | 2 parts |
| Example III-3 | $(CH_2CHCH_2-O-)_2 NC_3H_6Si(OC_2H_5)_3$ with epoxide groups | 2 parts |
| Example III-4 | $i\text{-}C_3H_7OTi(OC_2H_4NHC_2H_4NH_2)_3$ | 2 parts |
| Example III-5 | $(i\text{-}C_3H_7O)_4Ti\cdot[P(OC_8H_{17})_2OH]_2$ | 2 parts |
| Example III-6 | $(i\text{-}C_3H_7O)_4Ti\cdot[P(OC_8H_{17})_2SH]_2$ | 2 parts |
| Example III-7 | $H_2NC_3H_6Si(OC_2H_5)_3$ | 2 parts |
| Comp. Ex. III-1 | Nil | |
| Comp. Ex. III-2 | $H_2NC_3H_6Si(OC_2H_5)_3$ | 2 parts |
| Comp. Ex. III-3 | $H_2NC_3H_6Si(OC_2H_5)_3$ | 2 parts |
| Comp. Ex. III-4 | $CH_2CHCH_2OC_3H_6Si(OC_2H_5)_3$ with epoxide O | 2 parts |
| Comp. Ex. III-5 | $(CH_2CHCH_2-O-)_2 NC_3H_6Si(OC_2H_5)_3$ with epoxide groups | 2 parts |
| Comp. Ex. III-6 | $i\text{-}C_3H_7OTi(OC_2H_4NHC_2H_4NH_2)_3$ | 2 parts |
| Comp. Ex. III-7 | $(i\text{-}C_3H_7O)_4Ti\cdot[P(OC_8H_{17})_2OH]_2$ | 2 parts |
| Comp. Ex. III-8 | $(i\text{-}C_3H_7O)_4Ti\cdot[P(OC_8H_{17})_2SH]_2$ | 2 parts |

Evaluation was made in the following manner by using the resulting coating composition and video tape. The results are shown in Table III-2 and III-3.

(1) Pot life of coating composition for the second magnetic layer

Measurement and evaluation were made in the same manner as in Examples I-1 to I-7 and Comparative Examples I-1 to I-3.

(2) Video output

Signals were recorded and reproduced by using VTR AG6800 (manufactured by Matsushita Electric Industrial Co., Ltd.) to determine RF output.

(3) Loss of output

A loss in RF output was measured by using the aforesaid VTR after 200 running passes were repeatedly made under environmental conditions (40° C., 80% RH) over a period of 60 minutes.

TABLE III-2

Pot Life of Coating Composition for the Second Magnetic Layer

| | Brookfield Viscosity (Ps) of of Coating Composition | | | Surface Properties of Magnetic Layer | | |
|---|---|---|---|---|---|---|
| | After 0 hr | After 4 hrs | After 8 hrs | After 0 hr | After 4 hrs | After 8 hrs |
| Example III-1 | 83 | 85 | 86 | G | G | G |
| " III-2 | 90 | 92 | 94 | G | G | G |
| " III-3 | 72 | 73 | 74 | G | G | G |
| " III-4 | 70 | 76 | 78 | G | G | G |
| " III-5 | 68 | 71 | 73 | G | G | G |
| " III-6 | 80 | 84 | 85 | G | G | G |
| " III-7 | 78 | 81 | 82 | G | G | G |
| Comp. Ex. III-1 | 70 | 78 | 83 | G | G | G |
| " III-2 | 83 | 85 | 86 | G | G | G |
| " III-3 | 91 | 149 | 296 | G | B | B |
| " III-4 | 96 | 168 | 350 | G | B | B |
| " III-5 | 105 | 178 | 360 | G | B | B |
| " III-6 | 121 | 195 | 390 | G | B | B |
| " III-7 | 99 | 165 | 340 | G | B | B |
| " III-8 | 105 | 180 | 356 | G | B | B |

| | Video Output (dB) | Lowering of Output (dB) |
|---|---|---|
| Example III-1 | +1.5 | −0.3 |
| " III-2 | +1.2 | −0.2 |
| " III-3 | +1.7 | −0.3 |
| " III-4 | +1.4 | −0.4 |
| " III-5 | +1.5 | −0.2 |
| " III-6 | +1.4 | −0.4 |
| " III-7 | +1.2 | −0.3 |
| Comp. Ex. III-1 | ±0.0 | −2.8 |
| " III-2 | +0.9 | −3.8 |
| " III-3 to 8 | (Coating could not be made and no sample could not be obtained.) | |

It is apparent from the results of Table III-2 that when the magnetic recording media of the present invention are used as video tapes, they have a high reproduction output and exhibit good running properties and good durability even under severe conditions such as high temperature and high humidity conditions. When the coupling agent is used in combination with the polyisocyanate compound in the preparation of conventional single magnetic layer type magnetic recording media, a coating composition containing a mixture must be necessarily prepared before coating. Accordingly, pot life is very short for the conventional single layer arrangement even when one of these compounds is added immediately before coating and the problem of a rise in viscosity, etc., are caused so that a magnetic recording medium having excellent characteristics cannot be obtained unlike the magnetic recording medium of the present invention has, and production yield is low in the conventional arrangement.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a multi-layer magnetic layer structure comprising ferromagnetic powder and a binder, wherein said multi-layer magnetic layer structure is formed by coating a first composition containing the ferromagnetic powder a solvent and a polyisocyanate compound and substantially no epoxy compound or coupling agent capable of bonding said binder to surfaces of said ferromagnetic powders on said nonmagnetic support to form a first magnetic layer, and coating a second composition containing ferromagnetic powder, a solvent and an epoxy compound having at least one epoxy group or a coupling agent each capable of bonding said binder to surfaces of said ferromagnetic powder, and substantially no polyisocyanate compound on said first magnetic layer to form a second magnetic layer, wherein coating of said second magnetic layer is conducted simultaneously with or after coating said first magnetic layer while said first magnetic layer is still in a wet state, by a simultaneous or successive multiple layered coating method.

2. The magnetic recording medium as in claim 1, wherein said epoxy compound contains at least two epoxy groups.

3. The magnetic recording medium as in claim 2, wherein said second coating composition for said second magnetic layer is prepared by adding a part of said binder and a part of said solvent to said ferromagnetic powder and said epoxy compound, kneading the mixture, then adding the remainders of said binder and said solvent thereto and carrying out dispersion.

4. The magnetic recording medium as in claim 2, wherein said second coating composition used for said second magnetic layer contains said ferromagnetic powder dispersed in said binder, the surface of said ferromagnetic powder being previously treated by adsorbing said epoxy compound before said second coating composition is coated onto said first coating composition.

5. The magnetic recording medium as in claim 1, wherein said epoxy compound to be contained in said second coating composition used for said second magnetic layer is a low-molecular weight epoxy compound having at least one epoxy group and at least one polar group per molecule and a molecular weight of not more than 2000, said polar group being selected from the group consisting of —$SO_3M$, —$OSO_3M$, —$OPO(OM)_2$, —$PO(OM)_2$, and —COOM, wherein M is an alkali metal or ammonium ion.

6. The magnetic recording medium as in claim 5, wherein said second coating composition used for said second magnetic layer is prepared by adding a part of said binder and a part of said solvent to said ferromagnetic powder and said low-molecular weight epoxy compound having at least one epoxy group and at least one polar group, kneading the mixture, then adding the remainders of said binder and said solvent thereto and carrying out dispersion.

7. The magnetic recording medium as in claim 5, wherein said second coating composition used for said second magnetic layer contains said ferromagnetic powder dispersed in said binder, the surface of said ferromagnetic powder being previously treated by adsorbing said low-molecular weight epoxy compound having at least one epoxy group and at least one polar group before said second coating composition is coated onto said first coating composition.

8. The magnetic recording medium as in claim 1, wherein said coupling agent to be contained in said second coating composition used for said second magnetic layer is a coupling agent having at least one functional group selected from the group consisting of amino group, —OH group, —SH group and epoxy group.

9. The magnetic recording medium as in claim 8, wherein said second coating composition used for said second magnetic layer is prepared by kneading said ferromagnetic powder and said coupling agent with a part of said binder and a part of said solvent, then adding the reminders of said binder and said solvent thereto and carrying out dispersion.

10. The magnetic recording medium as in claim 8, wherein said second coating composition used for said second magnetic layer contains said ferromagnetic powder dispersed in said binder, the surface of said ferromagnetic powder being previously treated by adsorbing said coupling agent before said second coating composition is coated onto said first coating composition.

11. The magnetic recording medium as in claim 8, wherein said coupling agent is selected from the group consisting of a silane coupling agent, a zirconium coupling agent and an organic aluminum coupling compound.

12. The magnetic recording medium as in claim 1, wherein said epoxy compound has a molecular weight of not more than 2000 and an epoxy equivalent of not higher than 200 eq/g.

13. The magnetic recording medium as in claim 1, wherein said epoxy compound is an amine epoxy compound.

14. The magnetic recording medium as in claim 1, wherein said binder comprises at least one member selected from the group consisting of vinyl chloride copolymers, acrylic resins, cellulosic resins, polyurethane resins, polyester resins and polyether resins.

15. The magnetic recording medium as in claim 1, wherein said binder comprises a resin having at least one polar group selected from the group consisting of —COOM, —$SO_3M$, —$SO_4M$, —$PO_3M_2$, —$OPO_3M_2$ wherein M is hydrogen atom, an alkali metal or ammonium ion, amino group, ammonium salt group, —OH group, —SH group or epoxy group.

16. The magnetic recording medium as in claim 1, wherein said binder comprises a polyurethane resin having at least three —OH groups and at least one polar group in an amount of $0.5 \times 10^{-5}$ to $60 \times 10^{-5}$ eq/g.

17. The magnetic recording medium as in claim 1, wherein said binder comprises a vinyl chloride or acrylic resin having an —OH group content of $5\times10^{-5}$ to $200\times10^{-5}$ eq/g, an epoxy group content of $0.5\times10^{-5}$ to $100\times10^{-5}$ eq/g, a polar group content of $0.5\times10^{-5}$ to $60\times10^{-5}$ eq/g and a degree of polymerization of 200 to 600.

18. The magnetic recording medium as in claim 1, wherein said epoxy compound is selected from the group consisting of a bisphenol A epoxy resin, a glycidylamine epoxy resin, a novolak epoxy resin, a bisphenol F epoxy resin, a glycidyl ester resin, a resorcinyl diglycidyl ether, an alicyclic epoxy resin, an aliphatic epoxy resin, a glycidyl methacrylate monomer and a glycidyl phenyl ether.

19. The magnetic recording medium as in claim 1, wherein said epoxy compound or said coupling agent is present in an amount of 0.1 to 10 parts by weight based on 100 parts by weight of said ferromagnetic powder in said second magnetic layer.

* * * * *